Feb. 3, 1942.    B. BANNISTER    2,271,883
FISHING REEL
Filed Dec. 8, 1938    2 Sheets-Sheet 1
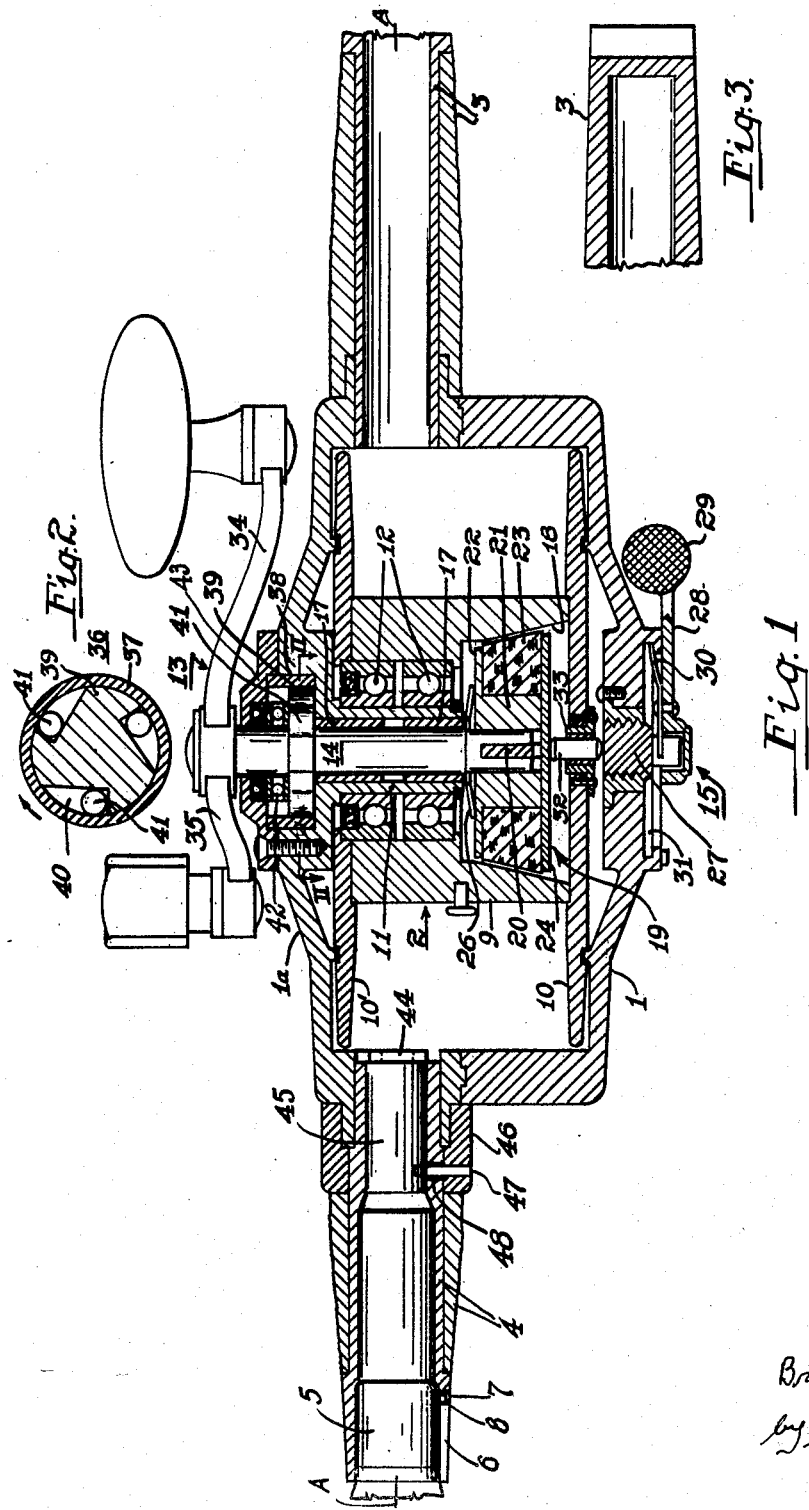
INVENTOR
Bryant Bannister
by Gerald B. Fjoflat
his Attorney Feb. 3, 1942.    B. BANNISTER    2,271,883
FISHING REEL
Filed Dec. 8, 1938    2 Sheets-Sheet 2

INVENTOR.
Bryant Bannister
BY Gerald B. Tjoflat
his ATTORNEY

Patented Feb. 3, 1942

2,271,883

UNITED STATES PATENT OFFICE 2,271,883

FISHING REEL

Bryant Bannister, Mount Lebanon, Pa.

Application December 8, 1938, Serial No. 244,599

3 Claims. (Cl. 242—84.5)

This invention relates to fishing reels and more particularly to reels such as are employed in deep salt-water fishing for large game fish, for example, the giant tuna, marlin, swordfish, sailfish, tarpon, sharks, and the like.

An object of this invention is to provide a reel of such construction that the tendency for the reel to turn about the longitudinal axis of the rod while applying considerable crank torque, will be greatly diminished.

Another object of the invention is to provide a reel and brake assembly of such construction that the variation in line tension necessary to rotate the spool against a given setting of the brake, may be reduced to a practical minimium as the diameter of the line winding on the spool changes.

A still further object of this invention is to provide a reel that shall be simple in construction, free from gears between the crank and spool and at the same time have the equivalent of two speeds for rewinding the line onto the spool, one for fast recovery of line against little line resistance, and one for recovery at reduced speed but against relatively great line resistance.

A still further object of the invention is to provide a form of brake and associated parts in a reel that shall have sufficient thermal capacity to absorb without objectionable temperature rise, the heat equivalent of the large amount of energy expended in short intervals of time by large fish which have been hooked and which repeatedly drag the line from the reel against brake resistance after recovery of line by pulling in towards the reel.

Other objects of the invention will, in part, be apparent and will, in part, be obvious from the following description taken in conjunction with the accompanying drawings in which:

Fig. 1 is a view in longitudinal section of the reel showing the relationship of the parts entering into the construction thereof;

Fig. 2 is a view in section on line II—II of Fig. 1.

Fig. 3 is a partial view in section of the butt of the rod;

Throughout the drawings and the specification, like reference characters indicate like parts.

Figure 4:
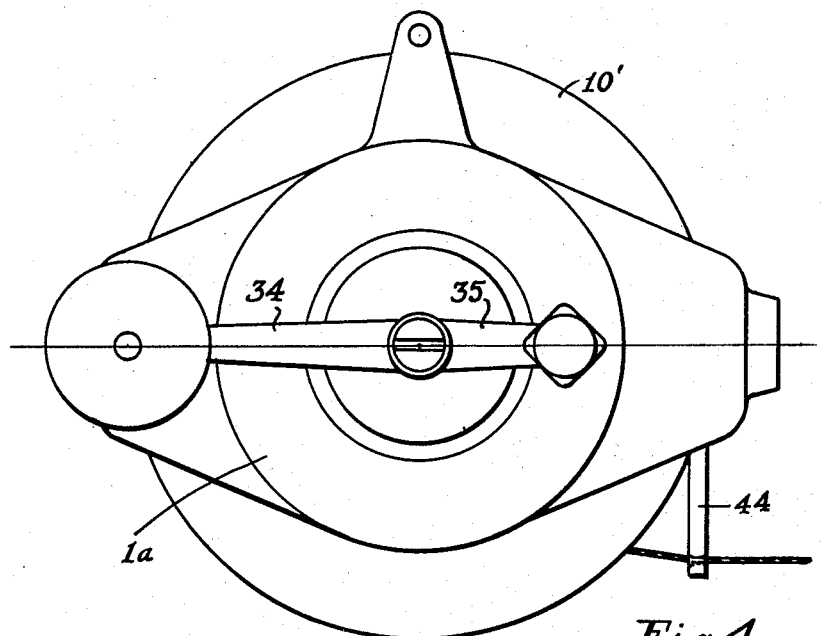
Fig. 4 is a view in elevation looking at the crank side of the reel.
Figure 5:
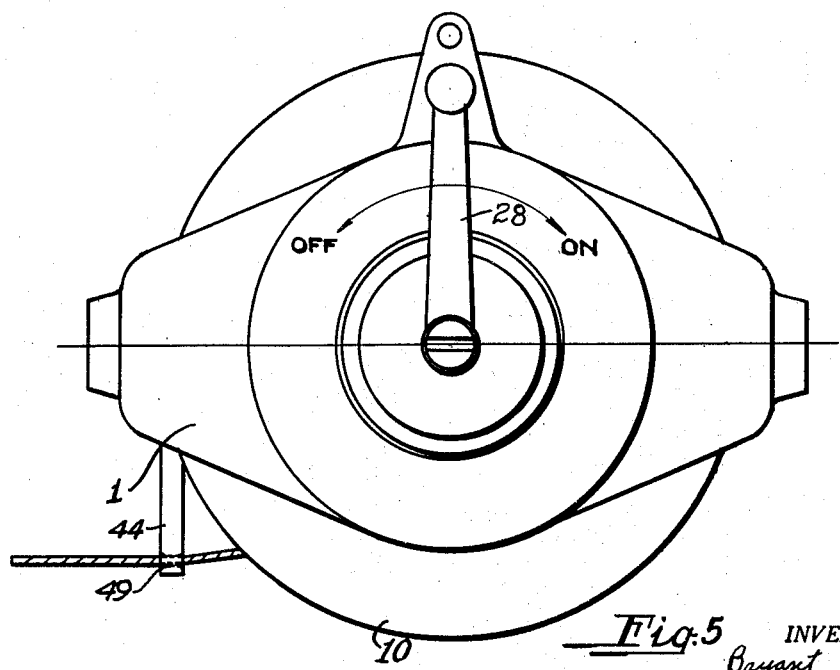
Fig. 5 is a view in elevation of the brake side of the reel.

In the drawings the form of fishing reel which I have chosen for purposes of illustration comprises a frame 1 which is open at the sides and closed at the ends and a spool 2 disposed within and supported by the frame. One end of the frame has a butt 3 (the outer end of which is shown in Fig. 3) secured thereto and the other end is provided with a socket piece 4 to which the usual rod (a portion 5 thereof being shown) may be attached. The outer end of the socket is formed with a longitudinal slot 6 and a short circumferential slot 7 with which a bayonet joint is formed when the rod is inserted, the rod being provided with a pin 8 for that purpose.

The spool comprises a core 9 and side plates 10 and 10' secured thereto. The core is mounted on a quill shaft 11 which extends from one of the members of the frame, for example member 1a, and it is preferred that it be integral with the frame. To reduce friction between the spool and the quill shaft, ball or anti-friction bearings 12 may be interposed between the shaft and the core.

In order that line may be spooled on the core, or to recover line when a fish has been caught a crank 13, illustrated as a two-speed crank, a shaft 14 and a friction device 15 are provided. Device 15, as will be shown later herein, is operable either as a brake or clutch, developing braking resistance when a fish is running out with the line and operating as a clutch when the line is being recovered. The shaft 14 extends through quill shaft 11 provided with bearings 17, and into operative engagement with the device 15. Device 15 comprises a frusto conical or cup-shaped cavity 18 formed with tapered sides in the body of core 9 and a disc 19 slidably mounted on but keyed to the free end of shaft 14, the key being indicated at 20.

Disc 19 comprises a core 21 having a flange 22 at the inner end thereof, an anti-friction ring or disc 23 mounted on core 21 and against flange 22 and a retaining plate 24 secured to core 21. The friction face or surface of disc 23 as shown in the drawings conforms to the surface of cavity 18 in core 9. Key 20 extends through the end of shaft 14 and through core 21, the core being provided with a slot 25 so that clutch disc 19 may be moved longitudinally on the shaft into or out of engagement with the tapered surface of the cavity 18. The clutch or brake disc 19 is normally urged outwardly by means of a spring 26 mounted between the end of quill shaft 11 and the disc. Clutch disc 19 may be actuated into engagement with the friction surface of core 9 by means of a screw 27 mounted in member 1 of the frame and this screw is disposed for operation by means of a crank or lever 28 having a thumb piece 29 at its outer end. In order to prevent turning of screw 27 out of the frame member 1, a spring 30 is secured on the inner face of lever 28 and one end of this spring operates in a groove 31 formed in the frame member which is coaxial with the axis of the screw. Movement of a screw 27 is transmitted to the clutch disc by means of a pin 32 that extends through a bearing and guide piece 33 in side member 10 of the spool and bears against retaining plate 24 of the disc 19.

In order to prevent turning of the two-speed spooling crank 13 which comprises a long crank 34 and a short crank 35 when a fish is pulling line out and thereby allow disc 19 to act as a brake with the core 9 of the spool, an overrunning clutch 36 is provided. This over-running clutch comprises a ring 37 which has a pressed fit with a socket 38 formed in frame member 1a so that it cannot turn, and a flange 39 formed preferably integrally with shaft 14 and provided with a plurality of recesses 40 such as shown in Fig. 2 in which rollers 41 are disposed. Thus, if the spooling crank 13 is turned in the direction of the arrow in Fig. 2, shaft 14 may be turned, but turning in the opposite direction is prevented because rollers 41 will lock shaft 14 to ring 37.

In order to make turning of the spooling crank 13 easy even though clutch disc 19 imposes a thrust in the direction of the cranks, a thrust-bearing 42 may be provided. Bearing 42 and shaft 14 are held in position in the assembled reel by means of a cap plate 43 which is secured to member 1a of the reel frame.

To facilitate spooling of the line on core 9 a guide or direction member 44 may be embodied in the reel frame. Guide member 44 is secured to the end of a stub-shaft 45 disposed in socket 4. Shaft 45 may be turned by means of a ferrule 46 and pin 47 which connects the ferrule to the shaft. The pin operates in a slot 48 extending partially around the circumference of the socket. As shown in Fig. 4 the fish line passes through an eye 49 in the outer end of member 44 to the spool. By turning ferrule 46 back and forth as line is reeled in better or more uniform distribution of line on the spool may be obtained.

In constructing a reel such as shown in the drawings it is preferred that the various parts of the spool be made heavy so that the spool will have ample thermal capacity for storing the heat that is developed by friction in the clutch brake when the fish is pulling on the line and running the line out. Also the spool parts are made large enough to provide ample heat dissipating surface to prevent too high a temperature rise as a result of the work absorbed by the metal parts.

Also, it will be observed from the proportions of the component parts of the reel that the diameter of reel core 9 is approximately one-half the diameter of the spool. Present day reels have spool cores of smaller diameter for a given line capacity, and are often less than one-tenth the spool diameter. This condition results in two effects, neither of which are desirable: first, the spool must be geared to the crank so that the line can be retrieved at a satisfactory rate when the winding is at a much reduced diameter; and secondly, with a constant braking effect, as is usual with modern reels, the pull on the line increases greatly as the winding diameter decreases. In the extreme case with a nearly empty spool, the reel embodying my invention would have a line tension of double that of the full spool because of the large core, whereas with the usual reel proportions as outlined above the line tension might increase to about ten times that existing when the spool is full.

In accordance with my invention, the large diameter spool core permits the crank to be directly connected to the spool, thus eliminating necessity for gears in the driving connection between cranking handle and the spool.

The conventional reels, as stated above, are provided with small diameter cores; therefore, when a large portion of the line is out the line or spool diameter is small. This means that the core must be driven through gear drives in order that the spool may be driven at speeds higher than the crank speed and cause the line to be retrieved as fast as circumstances require. By utilizing a large core, the crank may be directly connected to the spool core because more line per turn of the core is spooled on than is the case with a reel having a small diameter core.

In regard to the amount of heat that may be generated by the friction in the brake when a fish is making a dash and line is being let out, the following illustration will give some indication of the amount of heat units developed. If it is assumed that a fish makes a dash of 2,000 feet in one minute against a line resistance of fifty pounds, the work done is 2,000×50 or 100,000 foot-pounds in one minute which when converted into heat units is equivalent to 129 B. t. u. Since this amount of heat is generated in so short a time, it is practically impossible to radiate even the major part of it from the brake parts during the period of braking, therefore the thermal capacity of the brake cup which in the present instance is a part of the spool core 9, and the other associated parts of the spool are made large enough to avoid objectionable temperature rise. Thus, for example, if the spool core is of small or customary diameter and made of aluminum having a specific heat of about 0.22 and if it weighs one-half pound, the temperature rise, neglecting radiation, would be 1175° F., whereas if the core is of the same metal and made large enough to weigh three pounds, the temperature rise would be only 195° F. Of course, a rise in temperature of 1175° F. would be out of the question, whereas a temperature rise of 195° F. would not be. Therefore, in constructing a reel in accordance with my invention the spool and the core with its associated brake parts would be made, preferably of aluminum and heavy enough to absorb the equivalent heat units of the foot-pounds of work done by the fish.

Since core 9 is relatively massive compared to the maximum diameter of spool 2 and since core 9 is a part of the brake when acting as such, the heat developed in braking is absorbed directly by core 9. Since the spool plates or sides 10 and 10' have good contact and a relatively large area of contact with spool 9, the heat developed in spool 9 will be conducted to these spool sides or plates and dissipated in the air with greater or lesser degree, depending on the speed of rotation of the reel. In other words, plates 10 and 10' act as cooling fins for core 9. Also, since a fishing line is usually wet this will further aid in dissipating the heat developed in the core. Since core 9 forms part of the braking mechanism as well as the clutch mechanism, the brake parts, with the exception of the brake or clutch actuating parts, are all disposed within the spool and within the spool or reel frame. This makes for compactness of structure and ease of handling.

Also, it will be noted by inspection of Fig. 1 that the longitudinal axis A—A of the rod butt 3 passes through the geometrical center of the spool in one plane and is very close to the plane of crank 13. This construction reduces to a minimum the turning moment about the rod axis when cranking is done.

In operation the reel would be handled as follows:

Assuming that a considerable portion of the line is on the spool and that the brake lever 28 has been turned to a position where the brake disc 23 is in engagement with the cup in spool core 9, and that a fish is caught and starts to run with the line; in such case the reel cranks will remain stationary therefore friction will be developed between the brake disc 23, which is also stationary, and the braking surface of cup 18. The degree of friction or braking may be regulated by turning the brake lever in the direction of the word "on" as shown in Fig. 4. If the fish has run far enough and it is desired to reel in on the line and pull the fish in, the knob on the long crank 34 is grasped and the crank turned in a clockwise direction as shown in Fig. 4. In this case the brake is acting as a clutch and provides the driving connection between the cranking handle and the spool. But in any case, whenever a fish is running with the line, the over-running clutch 36 operates to lock shaft 14 against rotation, and this therefore locks the reel cranks against rotation, thereby protecting the operator's hands. Whenever the operator desires to reel in on the line and there is little or slight resistance to reeling-in, he may do so at a rapid rate by utilizing the short crank 35. Thus, the two cranks, one long and one short, give in effect a two-speed reel with its attendant advantages.

Having thus described the invention what I claim as new and desire to secure by Letters Patent is:

1. A fishing rod reel comprising, a frame, a spool within said frame, a stationary quill shaft secured to said frame for rotatably supporting said spool, a crank, a rotatable shaft connected to said crank and extending through said first-mentioned shaft, means for locking said rotatable shaft against rotation in one direction, a friction device slidably mounted on said shaft, and means for moving said friction device into or out of engagement with said spool, whereby the spool may be turned by said crank in one direction through said friction device and whereby said device acts as a brake when the spool is driven in the opposite direction.

2. A reel according to claim 1 characterized by the fact that the spool includes a core which is rotatably mounted on said quill shaft and that said core is formed with a cup in one end thereof, the surface of which is disposed to cooperate with said friction device when moved into engagement therewith to provide braking resistance to the turning of the spool in a direction that will cause said shaft to be locked against rotation and as a clutch when said shaft is turned in the opposite direction by said crank.

3. A fishing reel comprising a frame, a spool within said frame, a quill shaft within said frame and on which said spool is rotatably mounted, said spool comprising a thick walled core having flanges at the ends thereof, said core having a cavity in one end thereof, a shaft rotatively supported in said frame and extending through the quill shaft and into said core cavity, a friction member mounted on and keyed to said shaft and adjacent to said cavity, means for moving said friction member into and out of frictional engagement with the walls of said cavity, and means associated with said rotatable shaft for automatically locking it against rotation in one direction, said friction member when frictionally engaging said cavity walls acting as a brake to retard rotation of the spool when driven in the direction in which the rotatable shaft is locked and as a clutch for driving the spool by said rotatable shaft when the shaft is rotated in the opposite direction.

BRYANT BANNISTER.